United States Patent
Kurpinski et al.

(10) Patent No.: US 8,022,808 B2
(45) Date of Patent: Sep. 20, 2011

(54) VEHICLE POWER DOOR CONTROL WITH PASSIVE ENTRY

(75) Inventors: Christopher Kurpinski, Berkley, MI (US); Thomas Keeling, Plymouth, MI (US); Justin McBride, W. Bloomfield, MI (US); Toshihiro Wakamatsu, W. Bloomfield, MI (US); Michael Wiegand, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 938 days.

(21) Appl. No.: 11/906,235

(22) Filed: Oct. 1, 2007

(65) Prior Publication Data
US 2009/0085720 A1    Apr. 2, 2009

(51) Int. Cl.
| | |
|---|---|
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| B60Q 1/00 | (2006.01) |
| H04B 1/38 | (2006.01) |
| H04B 3/00 | (2006.01) |
| H04Q 9/00 | (2006.01) |
| H04Q 1/00 | (2006.01) |
| B60R 25/00 | (2006.01) |

(52) U.S. Cl. ............ 340/5.61; 340/5.72; 340/425.5
(58) Field of Classification Search .......... 340/5.61, 340/5.72, 5.6, 425, 438, 825
See application file for complete search history.

(56) References Cited

U.S. PATENT DOCUMENTS

| | | | | |
|---|---|---|---|---|
| 4,763,121 | A * | 8/1988 | Tomoda et al. | 340/5.61 |
| 6,188,326 | B1 * | 2/2001 | Flick | 340/825.69 |
| 6,323,565 | B1 * | 11/2001 | Williams et al. | 307/10.1 |
| 6,452,483 | B2 | 9/2002 | Chen et al. | |
| 6,583,715 | B1 * | 6/2003 | Benzie et al. | 340/5.64 |
| 6,617,961 | B1 * | 9/2003 | Janssen et al. | 340/5.8 |
| 6,825,752 | B2 * | 11/2004 | Nahata et al. | 340/5.64 |
| 6,847,289 | B2 | 1/2005 | Pang et al. | |
| 6,856,239 | B1 * | 2/2005 | Hicks | 340/5.7 |
| 7,148,790 | B2 | 12/2006 | Aoyama et al. | |
| 7,433,647 | B2 * | 10/2008 | LeMense et al. | 455/41.1 |

(Continued)

FOREIGN PATENT DOCUMENTS

DE    41 41 504 A1    8/1992

(Continued)

*Primary Examiner* — Daniel Wu
*Assistant Examiner* — Emily C Terrell
(74) *Attorney, Agent, or Firm* — Harness, Dickey & Pierce, PLC

(57) ABSTRACT

A vehicle equipped with a passive key entry system may employ a method of controlling a vehicle power sliding door (s) or other door(s), to accomplish locking, unlocking, opening and closing of such doors. A switch on a door handle may be activated by a physical touch or touches of a user, after which the method may proceed with inquiring and confirming if all vehicle doors are closed; inquiring and confirming if all vehicle doors are locked; inquiring and confirming if a valid passive entry key is exterior to and within range of the vehicle; unlocking a power sliding door with a lock motor; and opening the power sliding door with a door motor. Before actually performing a door opening, closing or locking, a passive entry key system on the vehicle may verify the presence of a passive entry key fob.

19 Claims, 6 Drawing Sheets

U.S. PATENT DOCUMENTS

| | | | |
|---|---|---|---|
| 7,439,632 B2 * | 10/2008 | Ogino et al. | 307/10.2 |
| 7,629,873 B2 * | 12/2009 | Ghabra et al. | 340/5.25 |
| 2001/0054952 A1 * | 12/2001 | Desai et al. | 340/5.72 |
| 2002/0093418 A1 * | 7/2002 | Schmitz et al. | 340/5.62 |
| 2002/0096572 A1 | 7/2002 | Chene et al. | |
| 2003/0174065 A1 * | 9/2003 | Losey | 340/825.72 |
| 2003/0204296 A1 | 10/2003 | Galli et al. | |
| 2003/0216817 A1 * | 11/2003 | Pudney | 700/17 |
| 2003/0222758 A1 * | 12/2003 | Willats et al. | 340/5.72 |
| 2004/0039511 A1 * | 2/2004 | Garnault et al. | 701/49 |
| 2005/0017842 A1 * | 1/2005 | Dematteo | 340/5.72 |
| 2005/0168322 A1 | 8/2005 | Appenrodt et al. | |
| 2006/0055510 A1 * | 3/2006 | Little et al. | 340/5.62 |
| 2006/0066439 A1 * | 3/2006 | Keeling et al. | 340/5.61 |
| 2006/0214769 A1 * | 9/2006 | Nakashima et al. | 340/5.72 |
| 2006/0224290 A1 | 10/2006 | Nakashima et al. | |
| 2006/0244312 A1 | 11/2006 | Ogino et al. | |
| 2007/0115096 A1 * | 5/2007 | Suzuki et al. | 340/5.72 |
| 2007/0203618 A1 | 8/2007 | McBride et al. | |
| 2010/0007461 A1 * | 1/2010 | Lacour et al. | 340/5.61 |

FOREIGN PATENT DOCUMENTS

| | | |
|---|---|---|
| DE | 10039756 | 2/2002 |
| DE | 10060397 | 6/2002 |
| DE | 10202928 | 7/2003 |
| DE | 103 20255 | 11/2004 |
| EP | 0 770 524 A1 | 5/1997 |
| JP | 4-354499 | 8/1992 |

* cited by examiner

VEHICLE POWER DOOR CONTROL WITH PASSIVE ENTRY

FIELD

The present disclosure relates to controlling a vehicle power door using a passive entry technique.

BACKGROUND

The statements in this section merely provide background information related to the present disclosure and may not constitute prior art. Modern vehicles may employ a passive entry system to unlock a vehicle door, such as a driver door. However, current passive entry systems still require the use of a remote key fob, such as pressing a button on the fob, or interior vehicle switches to activate the power doors. Therefore, if a passenger desires to enter a vehicle, or accidentally leaves a power door open when exiting a vehicle, the driver must presently use a key fob button or an interior vehicle switch to close the power door.

What is needed then is a device and a method that does not suffer from the above limitations. This will provide a device and a method that, in part, permits a driver the option of activating a power sliding door from a front door handle in conjunction with selective verification of a passive key fob. Additionally, an existing exterior lock switch, or an additional exterior lock switch, may be used to activate any power doors in conjunction with selective verification of a passive key fob.

SUMMARY

A method of controlling a power sliding door of a vehicle equipped with a passive key entry system may entail activating a switch on a door handle by physical touch of a user; inquiring whether all vehicle doors are closed; confirming that all vehicle doors are closed; inquiring whether all vehicle doors are locked; confirming that all vehicle doors are locked; inquiring if a valid passive entry key is exterior to and within range of the vehicle; confirming that a valid passive entry key is exterior to and within range of the vehicle; unlocking a power sliding door with a lock motor; and opening the power sliding door with a door motor.

Variations of the above methods are possible and may entail the use of double presses of a button or switch located on a vehicle door, such as a door handle, in conjunction with, or without verification of a passive entry key. Such presses, whether single or double, may be used to open a closed power sliding door, close a fully open power sliding door, or reversing the direction of a power sliding door that is currently closing. Additionally, any button presses, which are actually switch activations, may be used to lock and unlock one or more power sliding doors, other doors on a vehicle, or both. Before actually performing a door opening, door closing or door locking, a passive entry key system on the vehicle may verify the presence of a passive entry key fob to grant permission for successful button presses and door operation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
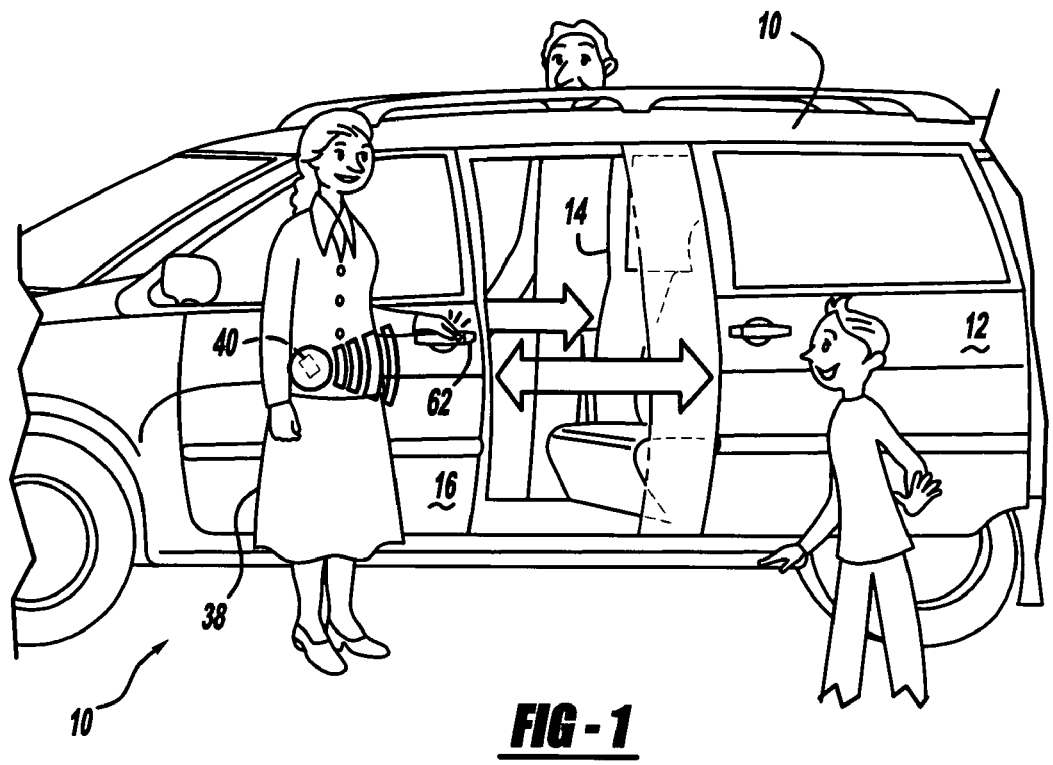
FIG. 1 is a side view of a vehicle depicting dual, power sliding doors.

The following description is merely exemplary in nature and is not intended to limit the present disclosure, application, or uses. With reference to FIGS. 1-7, a method and apparatus for controlling one or more power doors on a vehicle will be described. FIG. 1 generally depicts a vehicle 10 equipped with a left power sliding door 12 and a right power sliding door 14 that are both capable of operating in conjunction with a vehicle passive key entry or "smart key" type of wireless vehicle entry system. Vehicle passive key entry systems (smart key entry systems) do not require a user to press any buttons on a fob that he or she carries, for example, such as is normally required with fobs of non-passive key entry systems, when a user wants to gain access to a door or compartment of a vehicle. The user need only possess the fob to enter a vehicle.

Figure 2:
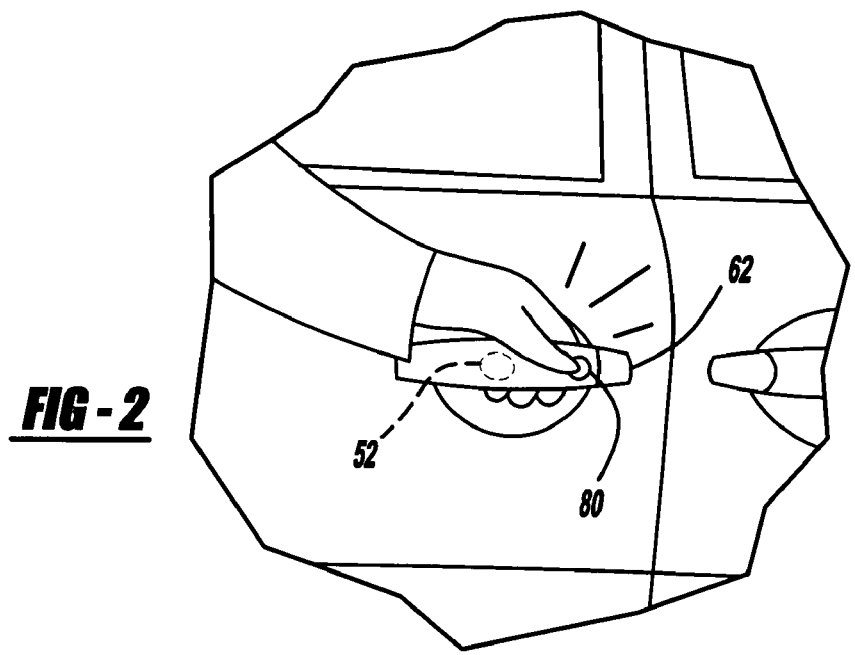
FIG. 2 is an enlarged view of a door handle depicting switch buttons.
Figure 3:
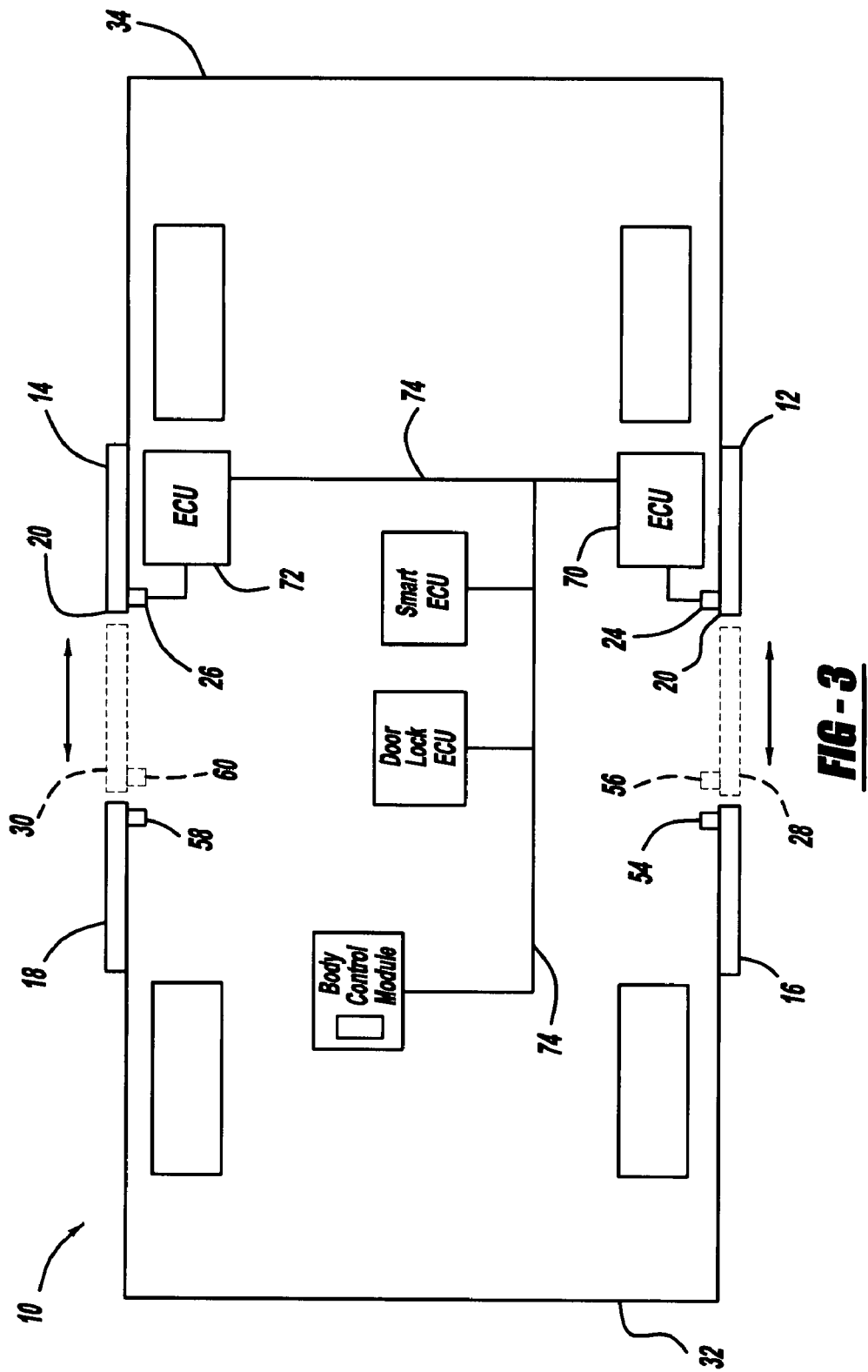
FIG. 3 is a top view of a vehicle depicting dual, power sliding doors and electronic control units related to a passive entry system operation for a vehicle.

Turning first to FIGS. 1-3, the vehicle 10 is equipped with a left power sliding door 12, a right power sliding door 14, a left front door 16 and a right front door 18. With the left and right front doors being hinged to pivot about a generally vertical axis, and the left and right power sliding doors 12, 14 located aft of the front doors, a configuration such as is typical of a minivan is depicted. FIG. 3 depicts mechanical, electrical and communication components of a vehicle 10 while FIG. 4 generally depicts electrical and communication components related to a passive key entry system of a vehicle.

When in an open position, the left power sliding door 12 reveals a left door opening 20, while the right power sliding door 14 reveals a right door opening 22. The power sliding doors 12, 14 may each be driven by a respective motor, such as a left motor 24 and a right motor 26. As depicted in FIG. 3, the power sliding doors 12, 14 are capable of sliding between an open position, depicted with solid lines, and a closed position, depicted with dashed lines. For instance, a closed left power sliding door is indicated with reference numeral 28 while a closed right power sliding door is indicated with reference numeral 30. When in operation, the left motor 24 is capable of moving the left power sliding door 12 toward a vehicle front end 32 or a vehicle rear end 34 while the right motor 26 is capable of moving the right power sliding door 14 toward a vehicle front end 32 or a vehicle rear end 34.

Figure 4:
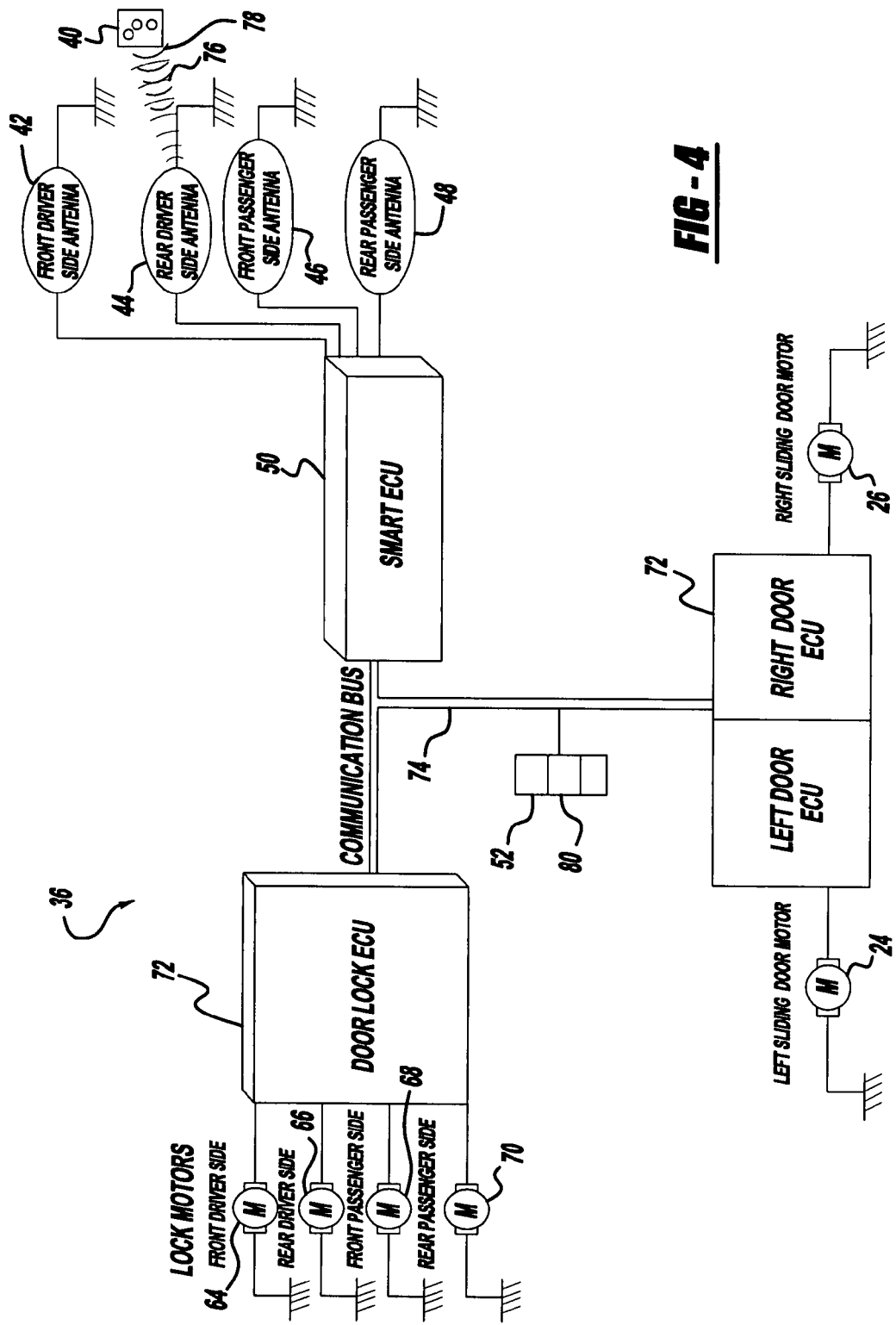
FIG. 4 is a diagram of components related to operation of a passive entry system for a vehicle.

Continuing with additional reference to FIG. 4, a passive entry or smart key entry system 36 will now be explained. One type of smart key entry system permits a vehicle user 38 to approach a vehicle 10 with a fob 40 or remote access device that places a door, such as left front door 16 or other vehicle access point (i.e., a trunk, lift gate, sliding door, etc.) of a vehicle 10 in an unlock standby mode. Such is accomplished without manipulating any buttons on the fob 40. To accomplish automatic door unlocking, the user must simply possess a smart key fob 40, also known as a transponder or electronic key, and walk within a specific frequency communication range, using for example radio frequencies, of the vehicle 10 so that communication can be made between an antenna, such as a front driver side antenna 42, rear driver side antenna 44, a front passenger side antenna 46, rear passenger side antenna, or other antenna, and at least one ECU, such as a smart ECU 50, within the vehicle 10. When the user then, for example, touches a sensor 52 (FIG. 2) on a door handle 62 of a door 16, a door lock will unlock. For instance, if the door lock of door 16 unlocks, the user may then pull on the door handle 62 to complete opening of the door 16.

With reference to FIGS. 2 and 3, one can see that a vehicle 10 may possess a variety of electronic control units, ("ECUs"), one of which is a smart ECU 50 that communicates with the smart key fob 40 to place door locks, such as a front driver side door lock 54, rear driver side door lock 56, front passenger side door lock 58, rear passenger side door lock 60, or other door lock, in an unlock standby mode. Actual unlocking of the vehicle door locks 54, 56, 58, 60 is accomplished in a subsequent process. In one type of smart key system, before a user 38 approaches the vehicle 10, that is, when a user 38 is outside of the communication range of the smart ECU 50, the smart ECU 50 causes a specific radio frequency signal to be emitted in a polling fashion from various antennas located within the vehicle 10. Typical antennas are the antennas 42, 44, 46, 48 within respective doors 16, 18, 12, 14 or antennas at the corners of the vehicle, such as within body fenders and quarter panels. The signal is pulsed at a specific time interval and may be pulsed in a polling fashion taking into consideration all of the on-board antennas. For instance, each antenna 42, 44, 46, 48 may emit a radio frequency at a specific strength up to a specific, given radius from each respective antenna at a given time interval.

In addition to door antennas, there may be an antenna proximate the vehicle trunk for controlling the unlocking of the trunk in conjunction with the fob 40. Regarding the trunk, the smart key system 36 may be placed into unlock standby mode when a user walks within the communication range with the fob 40, such that the system is prepared to accept the signal emitted by the fob 40 when the fob 40 is within range. The communication radius may be three to four feet, as an example, but may be determined by the manufacturer. A user 38 may then simply touch a sensor in the vehicle trunk handle to initiate unlocking of the trunk so that it may then be lifted to open it.

Continuing, when the transponder 40 is within the communication radius of an antenna 42, 44, 46, 48, the fob 40 may relay a unique security code to the smart ECU 50, and when the ECU 50 recognizes the unique security code, the door locks of the vehicle 10 are placed into unlock standby mode. As an example, the front driver side lock 54 may be placed into condition of unlock standby when the transponder 40 is within the communication radius or zone of door antenna 42. When a lock 54 is in unlock standby mode, the door handle 62 of the respective lock may be touched in a specific area, say on a rear side, to activate a contact sensor 52 to cause a lock motor, such as a front driver side lock motor 64 to unlock the front driver side door lock 54. The smart key system 36 may be configured to operate such that only the door lock in the same door as a door antenna 42, 44, 46, 48, with which the fob 40 is closest to and within range of, is placed into unlock standby mode.

Since each door lock has a respective door lock motor to lock and unlock each door lock, any one of the front driver side lock motor 64, rear driver side lock motor 66, front passenger side lock motor 68, or rear passenger side lock motor 70 can be activated to unlock its respective door 16, 12, 18, 14 when the fob 40 is within range of a respective antenna 42, 44, 46, 48 and the respective contact sensor 52 is contacted. The door lock motors are activated and controlled by a door lock ECU 72 upon contact with the contact sensor 52.

With continued reference to FIGS. 1-4, examples of operation of vehicle power doors, such as sliding side doors, utilizing passive entry will be described. In a practical example of the teachings, as a user 38 approaches the vehicle 10, the smart ECU 50 causes the rear driver side antenna 44 to emits a radio frequency signal 76. Actually, each door antenna 42, 44, 46, 48 may emit a radio frequency signal in a polling fashion. When the fob 40 is within the range of the signal 76, the fob 40 responds with a fob signal 78 and the smart ECU 50 verifies the fob signal 78 emitted from the specific fob 40 as one that is associated with the smart key entry system 36 of the vehicle 10. As a result of the fob verification process, at least the door lock 56 of the left power sliding door 12 is placed in unlock standby mode. That is, the system may be configured to only place door lock 56 in unlock standby mode because the fob 40 is closest to door lock 56. Alternatively, all door locks 54, 56, 58, 60 may be placed in unlock standby mode or even just the doors on the left, or driver side of the vehicle. Still yet, the system may be configured such that only one or both of the power sliding doors 12, 14 are placed into unlock standby mode. While in unlock standby mode, a contact sensor 52 within the front left door handle 62 is prepared (standing by) to receive physical contact, such as from a human hand, to unlock door lock 56, as an example. Together, the door open ECUs 70, 72 communicate utilizing communication bus 74 to unlock the door locks 54, 56, 58, 60 or the combination of such desired.

Although the user 38 at this juncture may have successfully unlocked the vehicle door locks 54, 56, 58, 60, the doors 16, 18, 12, 14 are still not physically opened. More specifically, the rear power sliding doors 12, 14 are not yet open to reveal respective openings 20, 22 for passenger ingress and egress. To cause the power sliding doors 12, 14 to physically open, the vehicle user 38 may use his or her finger, hand, etc. to touch a button 80, which is an electrical switch, to cause the left motor 24 to operate and physically open the left power sliding door 12. Alternatively, if both power sliding doors 12, 14 are closed, both may be configured to physically open when the button 80 is pressed after the passive entry system 36 verifies the fob 40 as a correct fob, as described above. In another configuration, if a power sliding door 12 or doors 12, 14 are already open, pressing the button 80 will close the power door 12 or doors 12, 14 and the vehicle may be automatically locked with locks 56, 60 upon such closing of the doors 12, 14. In another configuration, if the power sliding doors 12, 14 are already physically closed, but the vehicle 10 is unlocked, pressing the button 80 will lock the doors 12, 14 of the vehicle 10. In still yet another scenario, double-pressing the button 80 in quick succession may perform a different function. In the above-described locking and unlocking scenarios, the fob 40 must be present to perform door unlocking, but the fob 40 and verification may or may not be required for power door closing and power door locking.

In another configuration, the button 80 is utilized, but relies on driver input to decide the operation. For instance, a single press, or short press, can be used to perform a lock, and a double-press, or long press, can be used to activate the power doors. A short press is conducted by pressing and holding the button for a pre-determined amount of time, while a long press is conducted by pressing and holding the button 80 for a pre-determined amount of time that is longer than the predetermined time of the short press. Thus, the short press is a time period shorter than the time period of the long press.

In still yet another configuration of operation, the button 80 is used for unlocking a door or doors and physically opening the unlocked door or doors, while locking is performed by an autolock method. More specifically, while the user 38 has a valid key fob 40, that is, a key fob that is authorized or configured to work with the passive key entry system of the vehicle as described above, pressing the lock switch 80 once will unlock all the vehicle doors, such as doors 12, 14, 16, 18. Pressing the lock switch twice in quick succession (similar to double-clicking a mouse of a computer) will physically open the power door 12 or power doors 12, 14 if they are closed, and conversely, physically close the door 12 or doors 12, 14 if they were already physically open. Still yet, for example, if one power sliding door 12 is open at the same time that another power sliding door 14 is closed, the open power sliding door 12 will be physically closed upon a double-press, according to the teachings. Still yet, methods of operation allow a vehicle user 38, such as a driver, to unlock vehicle doors, regardless of whether they are the front swinging doors or rear sliding doors, without physically opening one or more of the power sliding doors 12, 14. Such a single-double button press method of operation might be desirable if there is a passenger standing outside a front door, such as at the left front door 16 or the right front door 18, but not at either of the rear, left power sliding door 12 and rear, right power sliding door 14. Upon a door being unlocked, the passenger could physically then open the left front door 12 in a traditional manner, without effecting any action on the rear poser sliding doors 12, 14. This scenario may be useful to prevent a pet or person inside the vehicle from jumping out of an open sliding power door 12, 14 yet permit a driver or right front passenger to enter the vehicle.

The present teachings may include other features of operation. For instance, if any vehicle door 12,14, 16,18 is unlocked, when a user requests that a power sliding door 12, 14 be physically opened, such power sliding door 12, 14 will physically open without the need for validating a smart key fob 40. In other words, a smart key fob 40 need not be within range of the system for anyone to open a power sliding door 12, 14 with the use of a respective motor 24, 26 upon pressing of a button 80. Because the vehicle doors 12, 14, 16, 18 are already unlocked, there is no security issue in permitting a power sliding door 12, 14 to be opened by a person without a valid key fob 40 being within range. This provides convenience to a family, for instance, when additional adult passengers may desire to open a power sliding door 12, 14 on the vehicle 10 when a driver 38 is out of range with the only valid key fob 40. To lock or unlock door locks on the same vehicle 10, a valid key fob 40 would be necessary, which maintains overall vehicle security and prevents, for example, locking something or someone inside the vehicle with the valid key being out of range or unlocking the vehicle and permitting access with valuable items inside the vehicle. Additionally, the power sliding doors 12, 14 then may be physically closed by pressing a door handle button 80 without a valid key being in range outside the vehicle 10, and even if a valid key is present inside the vehicle 10, that is, within the passenger compartment. Still yet another feature of the present teachings is that a user may unlock the vehicle doors 12, 14, 16, 18 without operating the power sliding doors 12, 14. The present teachings also allow a user to operate the power sliding doors 12, 14 without locking any of the other doors, such as the right and left front doors of the vehicle. Such features provide a user with greater control over locking of all vehicle doors and over operation of the power sliding doors 12, 14. Finally, the teachings of the present invention permit a user to open and close vehicle power sliding doors 12, 14 from a single door handle 62. One or more lock switch buttons 80 may by used to operate the power sliding doors 12, 14. That is, instead of a single button 80 that utilizes single and double presses, two buttons may be used with each utilizing a single press.

Figure 5:
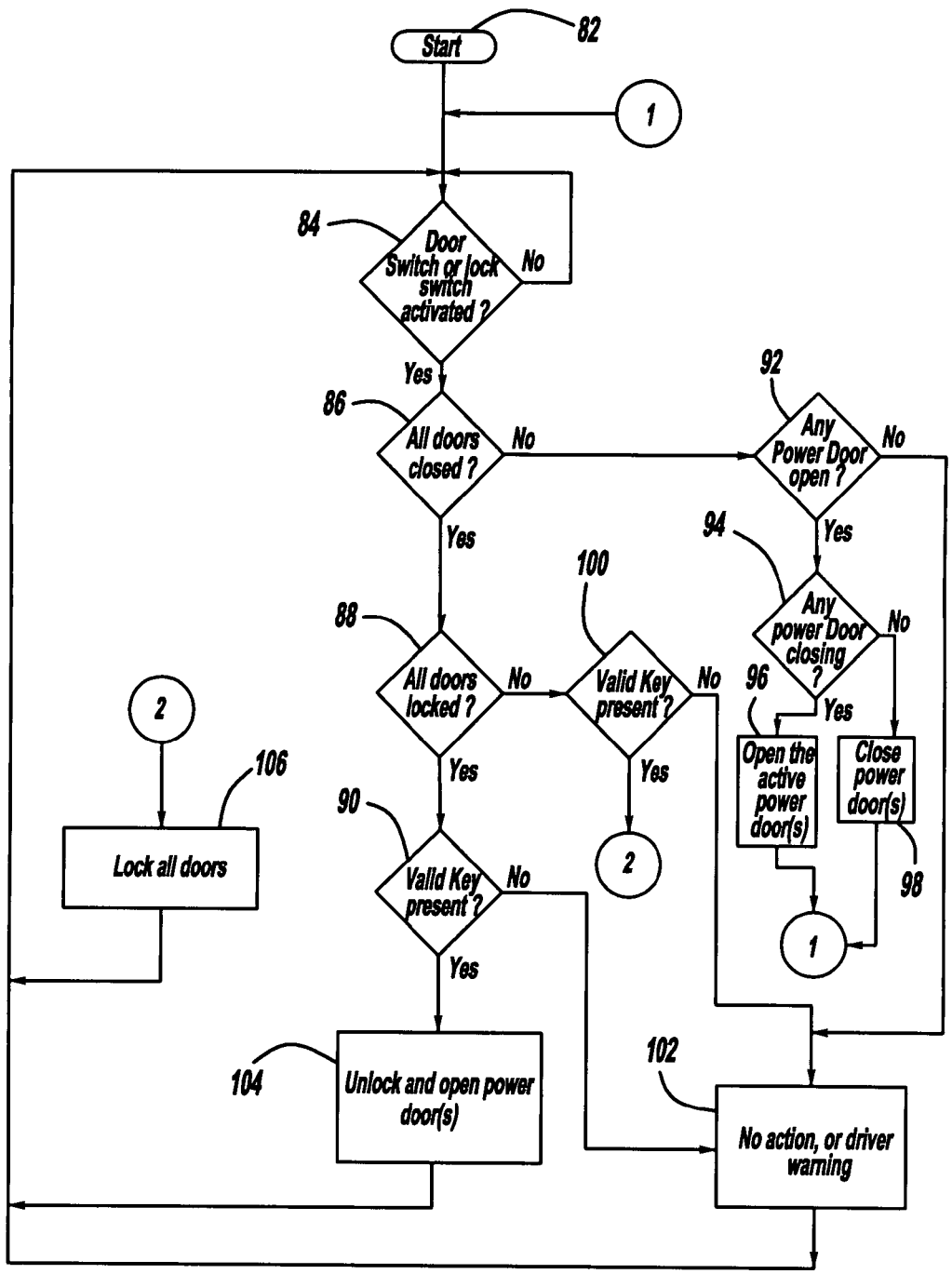
FIG. 5 is a flowchart of a first method of operation of power doors according to teachings of the invention.
Figure 6:
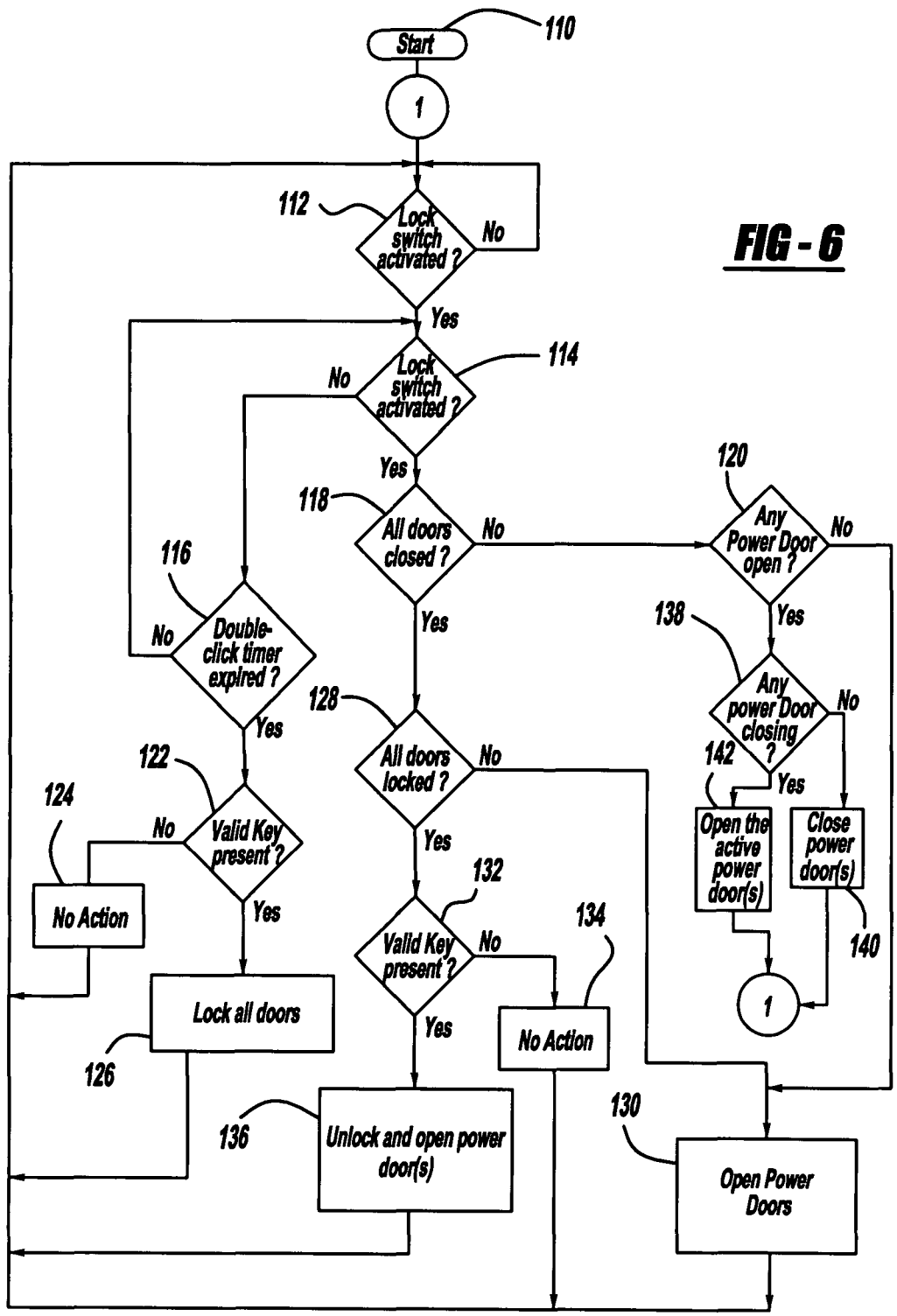
FIG. 6 is a flowchart of a second method of operation of power doors according to teachings of the invention.
Figure 7:
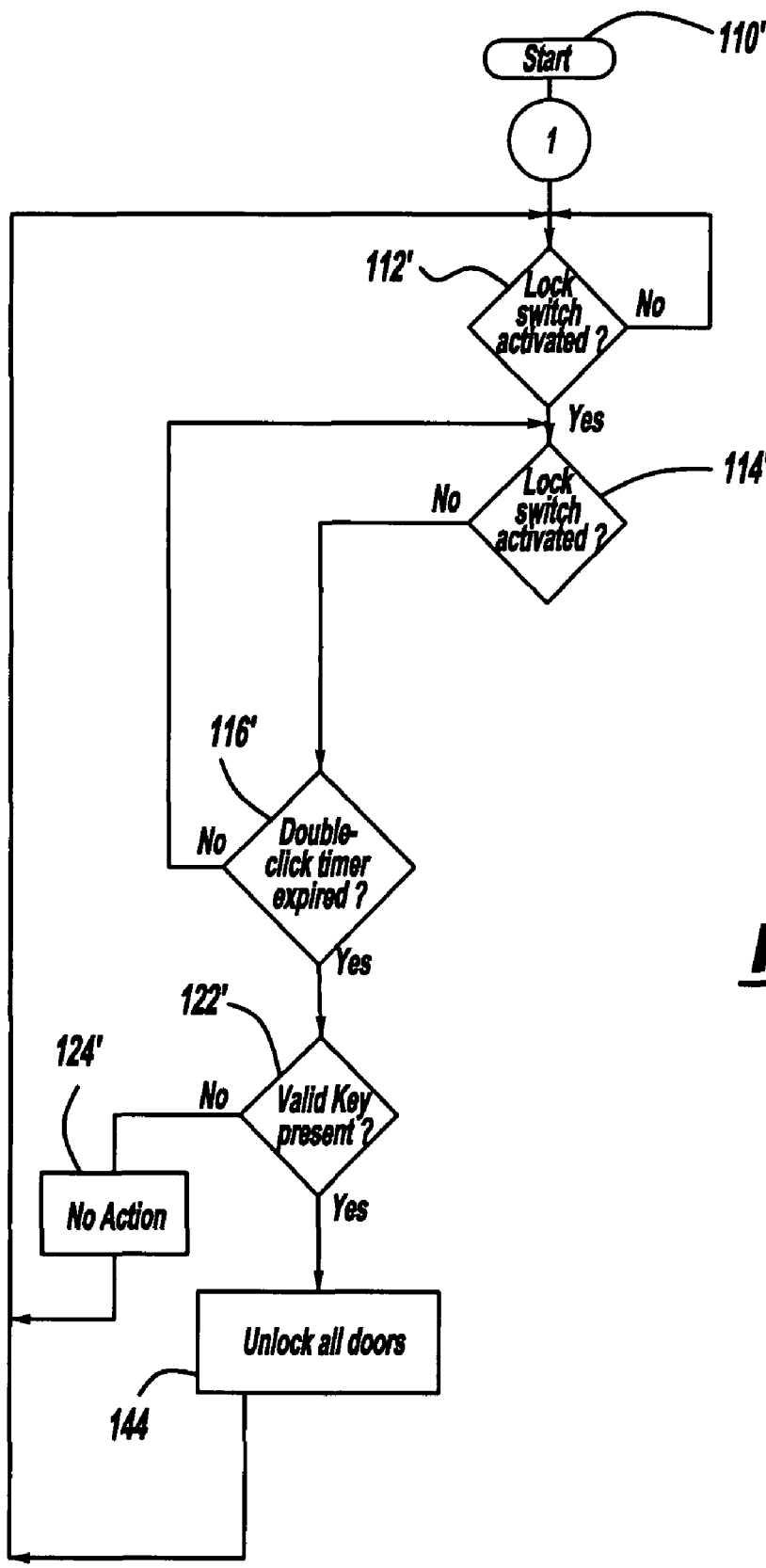
FIG. 7 is a flowchart of a third method of operation of power doors according to teachings of the invention.

While the invention has been described, in part, using FIGS. 1-4, which depict physical devices within the vehicle 10, FIGS. 5-7 depict logic, or operational, flowcharts that denote operational process flows of the vehicle power door control with passive entry. Turning now to FIG. 5, the logic begins at start block 82 and proceeds to inquiry block 84 where an inquiry is made as to whether the door button 80 (switch) has been activated. If the reply is "no" then the logic returns to reenter inquiry block 84, but if the reply is "yes" then the logic flows to inquiry block 86. Inquiry block 86 asks if all vehicle doors, such as front hinged doors and power sliding doors, are physically closed. If the answer is "no" then the logic proceeds to inquiry block 92 where the logic inquires if any power sliding doors 12, 14 are physically open, if the reply is "no" then the logic proceeds to block 102 and no action is taken, that is, no warning is delivered, for instance, to the driver, and the flow returns to inquiry block 84. However, at block 102, a driver warning, such as a beep, horn activation, or flashing light may be invoked. Alternatively, if the reply from inquiry block 92 is "yes" then the control logic proceeds to inquiry block 94, where the logic inquires if any of the power sliding doors 12, 14 are currently closing. If the reply is "no," then logic proceeds to block 98 and the power sliding doors 12, 14 are physically closed by motors 24, 26 as a result of command by the left door ECU 70 and right door ECU 72, respectfully, and the logic flow then returns to inquiry block 84. If the reply from inquiry block 94 is yes, then the logic flows to block 96 and the active, or closing power sliding door(s), are opened. The logic then returns to inquiry block 84.

Continuing with FIG. 5, if the reply from inquiry block 86 is "yes," then the logic flows from inquiry block 86 and into inquiry block 88 where the logic inquires if all vehicle doors 12, 14, 16, 18 are locked. If the reply is "no," then the logic flows to inquiry block 100 where the logic inquires if a valid key is present. If the reply is "yes," then the logic flows to block 106 where all vehicle doors 12, 14, 16, 18 are locked, and then the flow returns to inquiry block 84. If the reply from inquiry block 100 is "no," then the logic proceeds to block 102 and no action, for instance, is taken. If the result of the inquiry from block 88 is "yes," then the logic flows to inquiry block 90 where inquiry is made whether a valid key is present. Checking whether a valid key is present means the smart key entry system 36 searches for a valid smart key fob 40 outside of the vehicle 10. If a valid smart key is present, the logic flow proceeds to block 104 where all power sliding doors, such as power sliding doors 12, 14 are unlocked and physically opened. The logic then returns to inquiry block 84. If the reply from inquiry block 90 is "no," then the logic flows to block 102, and no action is taken by the smart key entry system 36. Alternatively, at block 102, a driver warning, such as a beep, horn sounding, or flash of light, may be issued.

Turning to the flowchart of FIG. 6, another method of operation of the smart key entry system 36 will be presented. Beginning with the start block 110, the flow of logic proceeds to inquiry block 112, which inquires whether the lock switch or door button 80 has been activated. If the reply is "no" then the logic returns to reenter the inquiry block 112. If the reply is "yes" then the logic proceeds to inquiry block 114, which inquires again if the lock switch or door button 80 has been activated. If the reply is "no" then the flow of logic proceeds to inquiry block 116, which inquires if the double-click timer has expired. The double click timer is the timer that governs whether a single or double press of the button 80 by a user will be recognized. That is, if the button is only pressed once by a user, then only a single press (aka "click") is recognized; however, if the button 80 is pressed twice (aka "double click") by a user and the two presses occur within a predetermined period of time, then a double click or press will be determined as having occurred before the double click timer has expired. If the result of the inquiry at inquiry block 116 is "no," then the logic returns to enter the inquiry block 114; however, if the result of the inquiry at block 116 is "yes," then the logic flows to inquiry block 122. At inquiry block 122, the logic inquires whether a valid smart key fob 40 is present or detectible by the system. If the reply from inquiry block 122 is "no," then no action is taken and the logic flows to inquiry block 112; however, if the reply is "yes," then the logic flows to block 126 and all vehicle doors 12, 14, 16, 18 are locked and the logic flows to inquiry block 112.

Continuing with FIG. 6, if the flow of logic is such that the reply from inquiry block 114 is "yes," then the flow of logic proceeds to inquiry block 118, which inquires whether all doors are physically closed. If the reply from inquiry block 118 is "no" then the logic flow proceeds to inquiry block 120, but if the reply from inquiry block 118 is "yes," then the logic flow proceeds to inquiry block 128. At inquiry block 128, the logic inquires whether all vehicle doors are locked. If the reply is "no," then the logic proceeds to block 130 and the power sliding doors 12, 14 are physically opened with assistance of the left door ECU 70 and left motor 24 and the right door ECU 72 and right motor 26. Upon opening of the power sliding doors 12, 14, the logic flow returns to inquiry block 112. If the reply from inquiry block 128 is "yes," then the logic flow proceeds to inquiry block 132 where the smart key entry system 36 determines whether a valid smart key fob 40 is within range about the exterior of the vehicle 10. If no valid key is found, then the logic flow proceeds to block 134, no action is taken and the flow proceeds to inquiry block 112; however, if a valid key is determined to be present, then the flow proceeds to block 136 and all power sliding doors are unlocked and physically opened. Unlocking is accomplished with the use of door lock ECU 72, and lock motors 66, 70 and door opening is accomplished with left and right door ECUs 70, 72 and left and right sliding door motors 24, 26.

Continuing from inquiry block 120, if the reply to any power door being open is "no," then the logic flows to block 130 and the power sliding doors 12, 14 are opened by the left and right door ECUs 70, 72. If the reply from inquiry block 120 is "yes," then the logic flow proceeds to inquiry block 138 which inquires whether any power sliding door 12, 14 is currently closing. If the reply from inquiry block 138 is "no," then the power sliding doors 12, 14 will be closed, as block 140 indicates; however, if the reply from inquiry block 138 is "yes," then the power sliding doors 12, 14 will be opened, as indicated by block 142. When the logic exits block 140 and block 142, then the logic returns to inquiry block 112.

Turning now to FIG. 7, another method of controlling power sliding doors is depicted. For efficiency in representation, FIG. 7 depicts only a part, or rather one control "leg," of a control method because it is the portion of the control method that is different from that of FIG. 6. In other words, the control flow method depicted in FIG. 7 is intended to be the same as that depicted in FIG. 6 with the exception of control block 144. Block 144 of FIG. 7 causes all vehicle doors to be locked, as opposed to being unlocked as in FIG. 6. More specifically, upon exiting start block 110', the flow proceeds to inquiry block 112' where the logic inquires whether the lock button 80 has been activated. If the response is "yes," then the logic proceeds to inquiry block 114' where the control logic inquires again if the lock button 80 has been pressed. If the reply is "no," then the flow logic proceeds to inquiry block 116', which inquires if a double click timer has expired, as noted in the explanation of the logic of FIG. 6. If the double click lock timer has expired, then the logic proceeds to inquiry block 122' which inquires if a valid smart key fob 40 is present. If the reply to the inquiry at inquiry block 122' is "yes," then the flow proceeds to block 144 and all vehicle doors are unlocked. If no valid key is present, then no action is taken and control returns to the inquiry block at 112'. Thus a difference between the logic of FIGS. 6 and 7 is that upon only a single pressing of the switch or button 80, the vehicle doors are either locked or unlocked.

Although the system and method as described above has largely been described as being employed on one or more power sliding doors, it is within the scope of the teachings to employ such a system on a rear tailgate or liftgate of a vehicle.

Therefore, by referencing FIGS. 1-7, a method of operating or controlling a power sliding door on a vehicle that may or may not be equipped with a passive entry key system, is disclosed. The method may entail: controlling a power sliding door of a vehicle equipped with a passive key entry system by activating a switch on a door handle by physical touch of a user; inquiring whether all vehicle doors are closed; confirming that all vehicle doors are closed; inquiring whether all vehicle doors are locked; confirming that all vehicle doors are locked; inquiring if a valid passive entry key is exterior to and within range of the vehicle; confirming that a valid passive entry key is exterior to and within range of the vehicle; unlocking a power sliding door with a lock motor; and opening the power sliding door with a door motor.

The method may also entail activating a switch on a door handle by physical touch of a user; inquiring whether all vehicle doors are closed; confirming that all vehicle doors are closed; inquiring whether all vehicle doors are locked; confirming that not all vehicle doors are locked; confirming that a valid passive entry key is exterior to and within range of the vehicle; and locking all vehicle doors.

The method may also entail activating a switch on a door handle by a physical touch of a user; inquiring whether all vehicle doors are closed; confirming that all vehicle doors are closed; inquiring whether all vehicle doors are locked; confirming that all vehicle doors are locked; inquiring if a valid passive entry key is exterior to and within range of the vehicle; confirming that no valid passive entry key is within range of the vehicle.

The method may also entail activating a switch on a door handle by a physical touch of a user; inquiring whether all vehicle doors are closed; confirming that not all vehicle doors are closed; inquiring if a power sliding door is open; confirming that the power sliding door is open; inquiring whether the power sliding door is undergoing a closing process; confirming that the power sliding door is undergoing a closing process; and opening the power sliding door that is undergoing a closing process.

The method may also entail activating a switch on a door handle by physical touch of a user; inquiring whether all vehicle doors are closed; confirming that not all vehicle doors are closed; inquiring whether a power sliding door is open; confirming that the power sliding door is open; inquiring whether the power sliding door is in a closing process; confirming that the power sliding door is not in a closing process; and closing the power sliding door.

The method may also entail inquiring whether an exterior door handle switch has been activated a first time by a human touch; confirming that an exterior door handle switch has been activated a first time by a human touch; inquiring whether an exterior door handle switch has been activated a second time by a human touch; confirming that an exterior door handle switch has not been activated a second time by a human touch; inquiring whether a predetermined period of time has elapsed; confirming that a predetermined period of time has elapsed; inquiring whether a valid passive entry key is within range and exterior to the vehicle; confirming that no valid passive entry key is within range and exterior to the vehicle.

The method may also entail inquiring whether an exterior door handle switch has been activated a first time by a human touch; confirming that an exterior door handle switch has been activated a first time by a human touch; inquiring whether an exterior door handle switch has been activated a second time by a human touch; confirming that an exterior door handle switch has not been activated a second time by a human touch; inquiring whether a predetermined period of time has elapsed; confirming that a predetermined period of time has elapsed; inquiring whether a valid passive entry key is within range and exterior to the vehicle; identifying a valid passive entry key; and locking all vehicle doors.

The method may also entail inquiring whether an exterior door handle switch has been activated a first time by a human touch; confirming that an exterior door handle switch has been activated a first time by a human touch; inquiring whether an exterior door handle switch has been activated a second time by a human touch; confirming that an exterior door handle switch has not been activated a second time by a human touch; inquiring whether a predetermined period of time has elapsed; confirming that a predetermined period of time has elapsed; inquiring whether a valid passive entry key is within range and exterior to the vehicle; identifying a valid passive entry key; and unlocking all vehicle doors.

The method may also entail inquiring whether an exterior door handle switch has been activated a first time by a human touch; confirming that an exterior door handle switch has been activated a first time by a human touch; inquiring whether an exterior door handle switch has been activated a second time by a human touch; confirming that an exterior door handle switch has been activated a second time by a human touch; inquiring whether all vehicle doors are closed; confirming that all vehicle doors are closed; inquiring whether all vehicle doors are locked; confirming that not all doors are locked; and opening a power sliding door.

The method also may entail inquiring whether an exterior door handle switch has been activated a first time by a human touch; confirming that an exterior door handle switch has been activated a first time by a human touch; inquiring whether an exterior door handle switch has been activated a second time by a human touch; confirming that an exterior door handle switch has been activated a second time by a human touch; inquiring whether all vehicle doors are closed; confirming that all vehicle doors are closed; inquiring whether all vehicle doors are locked; confirming that all doors are locked; inquiring whether a valid passive entry key is within range and exterior to the vehicle; confirming that valid passive entry key is within range and exterior to the vehicle; unlocking a power sliding door with a lock motor; and opening the power sliding door with a motor.

The method may also entail inquiring whether an exterior door handle switch has been activated a first time by a human touch; confirming that an exterior door handle switch has been activated a first time by a human touch; inquiring whether an exterior door handle switch has been activated a second time by a human touch; confirming that the exterior door handle switch has been activated a second time by a human touch; inquiring whether all doors are closed; confirming that not all doors have been closed; inquiring whether a power sliding door is open; confirming that the power sliding door is open; inquiring whether the power sliding door is closing; confirming that the power sliding door is not closing; and closing the power sliding door that is open.

The method may also entail inquiring whether an exterior door handle switch has been activated a first time by a human touch; confirming that an exterior door handle switch has been activated a first time by a human touch; inquiring whether an exterior door handle switch has been activated a second time by a human touch; confirming that the exterior door handle switch has been activated a second time by a human touch; inquiring whether all doors are closed; confirming that not all doors have been closed; inquiring whether a power sliding door is open; confirming that the power sliding door is open; inquiring whether the power sliding door is closing; confirming that the power sliding door is closing; and opening the power sliding door that is closing.

The method may also entail activating a door handle switch by physical touch of a user; inquiring whether all vehicle doors are closed; confirming that not all vehicle doors are closed; inquiring if a power sliding door is open; confirming that the power sliding door is open; inquiring whether the power sliding door is in a process of closing; confirming that the power sliding door is in a process of closing; and opening the power sliding door that is closing.

The method may also entail activating a door handle switch by physical touch of a user; inquiring whether all vehicle doors are closed; confirming that not all vehicle doors are closed; inquiring if a power sliding door is open; confirming that the power sliding door is open; inquiring whether the power sliding door is in a process of closing; confirming that the power sliding door is not in a process of closing; and closing the power sliding door.

In yet another method of operation, instead of the method employing a first and then a second touching of a switch or button 80 in succession, the button 80 may be activated, that is, pressed, for a short time period and long time period to effect different outcomes of the system. By substituting such a method of using time periods instead of single or double touches or presses into FIGS. 6 and 7, a different method of control may be established.

For instance, a method of controlling a power sliding door of a vehicle equipped with a passive key entry system may entail: establishing a short predetermined time period and a long predetermined time period for which an exterior door handle switch may be activated by a touch; inquiring whether an exterior door handle switch has been activated for the short predetermined time period by a touch; confirming that the exterior door handle switch has been activated for the short predetermined time period by the touch; inquiring whether a valid passive entry key is within range and exterior to the vehicle; and confirming that no valid passive entry key is within range and exterior to the vehicle and sounding an alert from the vehicle.

The method of controlling a power sliding door of a vehicle equipped with a passive key entry system may also entail: establishing a short predetermined time period and a long predetermined time period for which an exterior door handle switch may be activated by a touch; inquiring whether an exterior door handle switch has been activated for the short predetermined time period by a touch; confirming that the exterior door handle switch has been activated for the short predetermined time period by the touch; inquiring whether a valid passive entry key is within range and exterior to the vehicle; identifying a valid passive entry key; and locking all vehicle doors.

The method of controlling a power sliding door of a vehicle equipped with a passive key entry system may also entail: establishing a short predetermined time period and a long predetermined time period for which an exterior door handle switch may be activated by a touch; inquiring whether an exterior door handle switch has been activated for the short predetermined time period by a touch; confirming that the exterior door handle switch has been activated for the short predetermined time period by the touch; inquiring whether a valid passive entry key is within range and exterior to the vehicle; identifying a valid passive entry key; and unlocking all vehicle doors.

The method of controlling a power sliding door of a vehicle equipped with a passive key entry system may also entail: establishing a short predetermined time period and a long predetermined time period for which an exterior door handle switch may be activated by a touch; inquiring whether an exterior door handle switch has been activated for the long predetermined time period by a touch; confirming that an exterior door handle switch has been activated the long predetermined time; inquiring whether all vehicle doors are closed; confirming that all vehicle doors are closed; inquiring whether all vehicle doors are locked; confirming that not all doors are locked; and opening a power sliding door.

The method of controlling a power sliding door of a vehicle equipped with a passive key entry system may also entail: establishing a short predetermined time period and a long predetermined time period for which an exterior door handle switch may be activated by a touch; inquiring whether an exterior door handle switch has been activated for the long predetermined time period by a touch; confirming that an exterior door handle switch has been activated the for long predetermined time period; inquiring whether all vehicle doors are closed; confirming that all vehicle doors are closed; inquiring whether all vehicle doors are locked; confirming that all doors are locked; inquiring whether a valid passive entry key is within range and exterior to the vehicle; confirming that valid passive entry key is within range and exterior to the vehicle; unlocking a power sliding door with a lock motor; and opening the power sliding door with a motor.

The method of controlling a power sliding door of a vehicle equipped with a passive key entry system may also entail: establishing a short predetermined time period and a long predetermined time period for which an exterior door handle switch may be activated by a touch; inquiring whether an exterior door handle switch has been activated for the long predetermined time period by a touch; confirming that an exterior door handle switch has been activated for the long predetermined time period; inquiring whether all doors are closed; confirming that not all doors are closed; inquiring whether a power sliding door is open; confirming that the power sliding door is open; inquiring whether the power sliding door is closing; confirming that the power sliding door is closing; and opening the power sliding door that is closing by reversing a direction of the power sliding door with a motor.

What is claimed is:

1. A method of controlling power sliding doors of a vehicle equipped with a passive key entry system, the method comprising:
    activating a switch on a door handle by physical touch of a user, the door handle switch being attached to the exterior of one of the doors of the vehicle;
    inquiring whether all vehicle doors are closed after activating the switch on the door handle;
    confirming that all the vehicle doors are closed immediately after inquiring whether all the vehicle doors are closed;
    inquiring whether all the vehicle doors are locked after activating the switch on the door handle;
    confirming that all the vehicle doors are locked immediately after inquiring whether all the vehicle doors are locked;
    inquiring if a valid passive entry key is exterior to and within range of the vehicle after confirming that all the vehicle doors are closed and after confirming that all the vehicle doors are locked;
    confirming that the valid passive entry key is exterior to and within the range of the vehicle immediately after inquiring if the valid passive entry key is exterior to and within the range of the vehicle;
    unlocking a power sliding door with a lock motor immediately after confirming that the valid passive entry key is exterior to and within the range of the vehicle; and
    opening the power sliding door with a door motor immediately after unlocking the power sliding door.

2. The method of controlling power sliding doors according to claim 1, the method further comprising the following steps in the order named:
    confirming that not all the vehicle doors are closed;
    inquiring if a power sliding door is open;
    confirming that the power sliding door is open;
    inquiring whether the power sliding door is undergoing a closing process;
    confirming that the power sliding door is in a closing process; and
    opening the power sliding door that is in a closing process.

3. The method of controlling power sliding doors according to claim 1, the method further comprising the following steps in the order named:
    confirming that not all the vehicle doors are closed;
    inquiring whether a power sliding door is open;
    confirming that the power sliding door is open;
    inquiring whether the power sliding door is in a closing process;
    confirming that the power sliding door is not in a closing process; and
    closing the power sliding door.

4. The method of controlling power sliding doors of a vehicle according to claim 1, the method further comprising the following steps in the order named:
    confirming that all the vehicle doors are closed;
    inquiring whether all the vehicle doors are locked;
    confirming that not all the vehicle doors are locked;
    confirming that a valid passive entry key is exterior to and within range of the vehicle; and
    locking all the vehicle doors.

5. A method of controlling a power sliding door of a vehicle equipped with a passive key entry system, the method comprising:
    inquiring whether an exterior door handle switch has been activated a first time by a first human touch, the exterior door handle switch being attached to the door of the vehicle;
    confirming that the exterior door handle switch has been activated the first time by the first human touch immediately after inquiring whether an exterior door handle switch has been activated the first time;
    inquiring whether the exterior door handle switch has been activated a second time by a second human touch immediately after confirming that the exterior door handle has been activated the first time;

confirming that the exterior door handle switch has not been activated the second time by the second human touch immediately after inquiring whether the exterior door handle switch has been activated the second time;

inquiring whether a predetermined period of time has elapsed since confirming that the exterior door handle switch has not been activated the second time;

confirming that the predetermined period of time has elapsed;

inquiring whether a valid passive entry key is within range and exterior to the vehicle immediately after confirming that the predetermined time has elapsed;

identifying the valid passive entry key immediately after inquiring whether a valid passive entry key is within the range and exterior to the vehicle; and locking all vehicle doors immediately after identifying the valid passive entry key.

6. The method of controlling a power sliding door according to claim 5, the method further comprising:

confirming that the valid passive entry key is not within range and exterior to the vehicle after inquiring whether a valid passive entry key is within the range and exterior to the vehicle.

7. The method of controlling a power sliding door according to claim 5, the method further comprising:

unlocking all the vehicle doors after identifying the valid passive entry key.

8. The method of controlling a power sliding door according to claim 5, the method further comprising:

confirming that the exterior door handle switch has been activated the second time by the second human touch;

inquiring whether all the vehicle doors are closed;

confirming that all the vehicle doors are closed;

inquiring whether all the vehicle doors are locked;

confirming that not all the vehicle doors are locked; and opening a power sliding door.

9. The method of controlling a power sliding door according to claim 5, the method further comprising:

confirming that the exterior door handle switch has been activated the second time by the second human touch;

inquiring whether all the vehicle doors are closed;

confirming that all the vehicle doors are closed;

inquiring whether all the vehicle doors are locked;

confirming that all the vehicle doors are locked;

inquiring whether the valid passive entry key is within range and exterior to the vehicle;

confirming that the valid passive entry key is within the range and exterior to the vehicle;

unlocking a power sliding door with a lock motor; and opening the power sliding door with an opening power sliding door motor.

10. The method of controlling a power sliding door according to claim 5, the method further comprising:

confirming that the exterior door handle switch has been activated the second time by the second human touch;

inquiring whether all the vehicle doors are closed;

confirming that not all the vehicle doors have been closed;

inquiring whether a power sliding door is open;

confirming that the power sliding door is open;

inquiring whether the power sliding door is closing;

confirming that the power sliding door is not closing; and closing the power sliding door that is open.

11. The method of controlling a power sliding door according to claim 5, the method further comprising:

confirming that the exterior door handle switch has been activated the second time by the second human touch;

inquiring whether all the vehicle doors are closed;

confirming that not all the vehicle doors have been closed;

inquiring whether a power sliding door is open;

confirming that the power sliding door is open;

inquiring whether the power sliding door is closing;

confirming that the power sliding door is closing; and opening the power sliding door that is closing.

12. A method of controlling a power sliding door of a vehicle equipped with a passive key entry system, the method comprising the following steps in the order named:

establishing a short predetermined time period for which an exterior door handle switch may be activated by a touch, the exterior door handle switch being attached to the door of the vehicle;

establishing a long predetermined time period for which the exterior door handle switch may be activated by the touch;

inquiring whether the exterior door handle switch has been activated during the short predetermined time period by the touch;

confirming that the exterior door handle switch has been activated for the short predetermined time period by the touch;

inquiring whether a valid passive entry key is within range and exterior to the vehicle immediately after confirming that the exterior door handle switch has been activated;

identifying the valid passive entry key immediately after inquiring whether the valid passive entry key is within the range and exterior to the vehicle; and locking all vehicle doors immediately after identifying the passive entry key.

13. A method of controlling a power sliding door according to claim 12, the method further comprising:

confirming that the valid passive entry key is not within the range and exterior to the vehicle immediately after inquiring whether the valid passive entry key is within the range and exterior to the vehicle; and sounding an alert from the vehicle immediately after confirming that the valid passive entry key is not within the range and exterior to the vehicle.

14. The method of controlling a power sliding door according to claim 12, the method further comprising:

unlocking all vehicle doors after identifying the valid passive entry key.

15. The method of controlling a power sliding door according to claim 12, the method further comprising the following steps in the order named:

inquiring whether the exterior door handle switch has been activated for the long predetermined time period by the touch;

confirming that the exterior door handle switch has been activated for the long predetermined time;

inquiring whether all the vehicle doors are closed;

confirming that all the vehicle doors are closed;

inquiring whether all the vehicle doors are locked;

confirming that not all the vehicle doors are locked; and opening a power sliding door.

16. The method of controlling a power sliding door according to claim 12, the method further comprising the following steps in the order named:

inquiring whether the exterior door handle switch has been activated for the long predetermined time period by the touch;

confirming that the exterior door handle switch has been activated for the long predetermined time;

inquiring whether all the vehicle doors are closed;
confirming that all the vehicle doors are closed;
inquiring whether all the vehicle doors are locked;
confirming that all the vehicle doors are locked;
inquiring whether the valid passive entry key is within the range and exterior to the vehicle;
confirming that the valid passive entry key is within the range and exterior to the vehicle;
unlocking a power sliding door with a lock motor; and
opening the power sliding door with an opening power sliding door motor.

17. The method of controlling a power sliding door according to claim 12, the method further comprising the following steps in the order named:
inquiring whether an exterior door handle switch has been activated for the long predetermined time period by the touch;
confirming that the exterior door handle switch has been activated for the long predetermined time;
inquiring whether all the vehicle doors are closed;
confirming that not all the vehicle doors are closed;
inquiring whether a power sliding door is open;
confirming that the power sliding door is open;
inquiring whether the power sliding door is closing;
confirming that the power sliding door is closing; and
opening the power sliding door that is closing by reversing a direction of the power sliding door with a power sliding door motor.

18. A method of controlling a power sliding door of a vehicle equipped with a passive key entry system, the method comprising the following steps in the order named:
inquiring whether an exterior door handle switch has been activated a first time by a first human touch, the exterior door handle switch being attached to a door of the vehicle;
confirming that the exterior door handle switch has been activated the first time by the first human touch;
inquiring whether the exterior door handle switch has been activated a second time by a second human touch immediately after confirming that the exterior door handle switch has been activated the first time;
confirming that the exterior door handle switch has been activated the second time by the second human touch;
inquiring whether all vehicle doors are closed immediately after confirming that the exterior door handle switch has been activated the second time;
confirming that all the vehicle doors are closed;
inquiring whether all the vehicle doors are locked;
confirming that all the vehicle doors are locked;
inquiring whether the valid passive entry key is within the range and exterior to the vehicle immediately after confirming that all the vehicle doors are locked;
confirming that the valid passive entry key is within the range and exterior to the vehicle;
unlocking a power sliding door with a lock motor; and
opening the power sliding door with an opening power sliding door motor.

19. A method of controlling a power sliding door of a vehicle equipped with a passive key entry system, the method comprising the following steps in the order named:
establishing a short predetermined time period for which an exterior door handle switch may be activated by a touch the exterior door handle switch being attached to a door of the vehicle;
establishing a long predetermined time period for which the exterior door handle switch may be activated by the touch;
inquiring whether the exterior door handle switch has been activated for the long predetermined time period by the touch;
confirming that the exterior door handle switch has been activated for the long predetermined time;
inquiring whether all vehicle doors are closed;
confirming that all the vehicle doors are closed;
inquiring whether all the vehicle doors are locked;
confirming that all the vehicle doors are locked;
inquiring whether a valid passive entry key is within range and exterior to the vehicle immediately after confirming that all the vehicle doors are locked;
confirming that the valid passive entry key is within the range and exterior to the vehicle;
unlocking a power sliding door with a lock motor immediately after confirming the valid passive entry key is within the range and exterior to the vehicle; and
opening the power sliding door with an opening power sliding door motor after unlocking the power sliding door.

* * * * *